United States Patent
Tsai et al.

(10) Patent No.: US 8,648,983 B2
(45) Date of Patent: Feb. 11, 2014

(54) BLUE PHASE LIQUID CRYSTAL DISPLAY AND METHOD FOR FABRICATING THE SAME

(75) Inventors: Cheng-Yeh Tsai, Hsin-Chu (TW); Tai-Hsiang Huang, Hsin-Chu (TW); Po-Lun Chen, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 320 days.

(21) Appl. No.: 12/880,792

(22) Filed: Sep. 13, 2010

(65) Prior Publication Data

US 2011/0261306 A1 Oct. 27, 2011

(30) Foreign Application Priority Data

Apr. 22, 2010 (TW) .............................. 99112704 A (51) Int. Cl.
*G02F 1/1333* (2006.01)
*G02F 1/1343* (2006.01)
*G02F 1/13* (2006.01)

(52) U.S. Cl.
USPC ................ 349/92; 349/93; 349/141; 349/187

(58) Field of Classification Search
USPC ................................ 349/86, 187, 92–93, 141
See application file for complete search history.

(56) References Cited

U.S. PATENT DOCUMENTS

| | | | |
|---|---|---|---|
| 7,623,214 B2 | 11/2009 | Coles et al. | |
| 8,319,924 B2 * | 11/2012 | Kim et al. | 349/122 |
| 2003/0067579 A1 | 4/2003 | Inoue et al. | |
| 2008/0153379 A1 * | 6/2008 | Kumazawa et al. | 445/25 |
| 2010/0163868 A1 * | 7/2010 | Yamazaki et al. | 257/43 |
| 2010/0231842 A1 * | 9/2010 | Ishitani et al. | 349/156 |
| 2010/0315585 A1 * | 12/2010 | Chien et al. | 349/201 |

FOREIGN PATENT DOCUMENTS

| | | |
|---|---|---|
| CN | 1934222 A | 3/2007 |
| CN | 100543111 C | 9/2009 |
| CN | 101726953 A | 6/2010 |
| JP | 2003327966 A | 11/2003 |
| TW | 200600880 | 1/2006 |
| TW | I252341 | 4/2006 |
| TW | 200809353 | 2/2008 |

OTHER PUBLICATIONS

English language translation of abstract of TW 200600880 (published Jan. 1, 2006).
English language translation of abstract of TW I252341 (published Apr. 1, 2006).

(Continued)

*Primary Examiner* — Nathanael R Briggs
(74) *Attorney, Agent, or Firm* — McClure, Qualey & Rodack, LLP (57) ABSTRACT

A method for fabricating a blue phase liquid crystal display is provided. A first substrate is arranged opposite to a second substrate, in which the first and second substrates include a first and a second electrode, respectively. A blue phase liquid crystal layer is sealed between the first substrate and the second substrate, in which the blue phase liquid crystal layer includes a positive blue phase liquid crystal and a monomer. A voltage is applied to the first electrode and the second electrode such that a vertical electric field is formed. The blue phase liquid crystal layer is illuminated with a light source such that the monomer performs polymerization to produce a polymer-stabilized positive blue phase liquid crystal. A blue phase liquid crystal display is also disclosed herein.

16 Claims, 10 Drawing Sheets

(56) References Cited

OTHER PUBLICATIONS

English language translation of abstract of TW 200809353 (published Feb. 16, 2008).
English language translation of abstract of JP 2003327966A (published Nov. 19, 2003).
English translation of abstract and pertinent parts of CN 1934222 A.
English translation of abstract and pertinent parts of CN 1100543111 C.
English translation of abstract of CN 101726953A.

* cited by examiner

BLUE PHASE LIQUID CRYSTAL DISPLAY AND METHOD FOR FABRICATING THE SAME

RELATED APPLICATIONS

This application claims priority to Taiwan Patent Application Serial Number 99112704, filed Apr. 22, 2010, which is herein incorporated by reference.

BACKGROUND

1. Technical Field

The present disclosure relates to a display. More particularly, the present disclosure relates to a blue phase liquid crystal display.

2. Description of Related Art

In recent years, for improving the display quality of a liquid crystal display, blue phase liquid crystals with rapid response are gradually valued, in which the blue phase represents a liquid crystal phase between the isotropic phase and the cholesteric phase and only exists in a narrow temperature range of about 1° C.

Blue phase has three different types, which are the first blue phase (BP), the second blue phase (BP) and the third blue phase (BP), in which liquid crystals of the first blue phase and the second blue phase are in a cubic form, and liquid crystals of the third blue phase are in an amorphous form and exist with a highest temperature of blue phases of the three types.

Figure 1A:
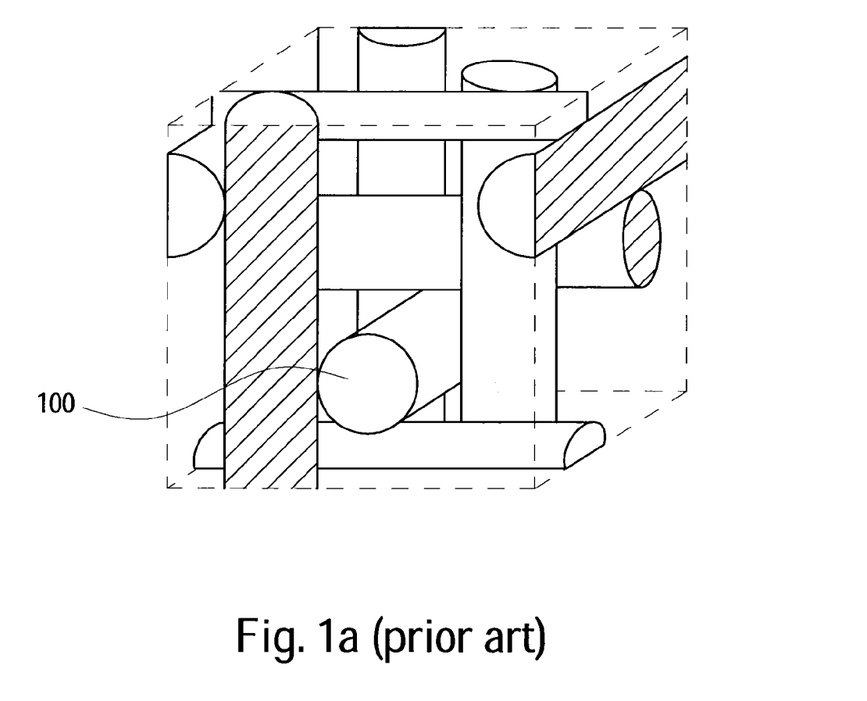
FIG. 1a and FIG. 1b are diagrams of lattice structure and disclination line, respectively, of the first blue phase liquid crystals.
Figure 1B:
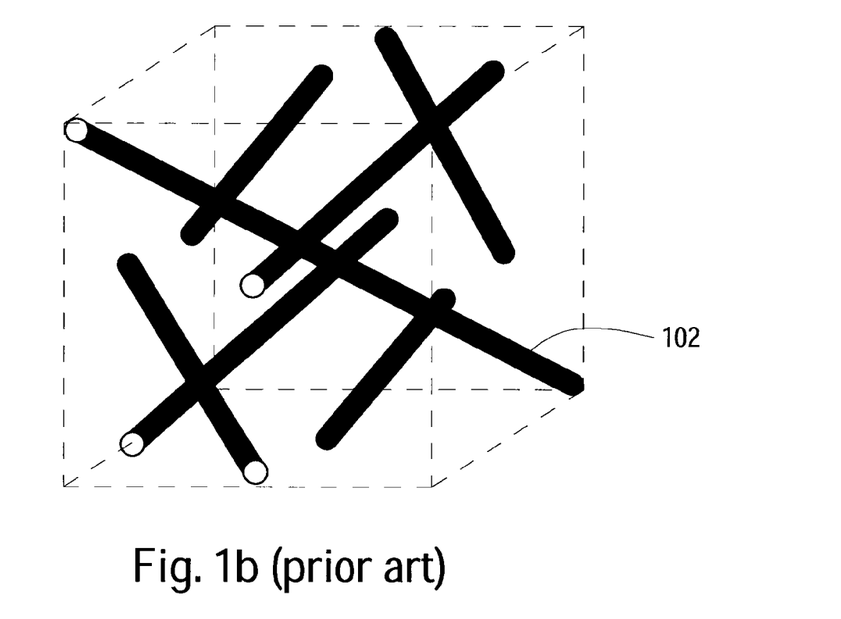
Figure 1C:
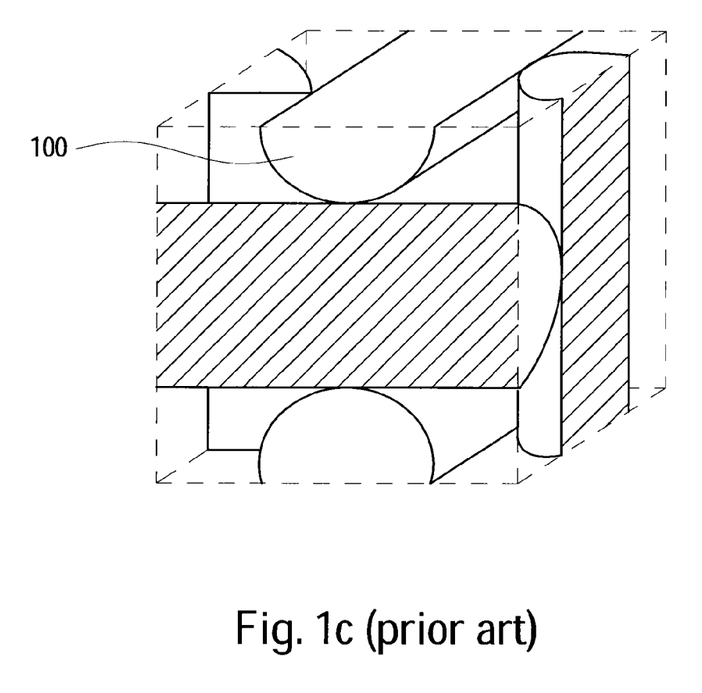
FIG. 1c and FIG. 1d are diagrams of lattice structure and disclination line, respectively, of the second blue phase liquid crystals.
Figure 1D:
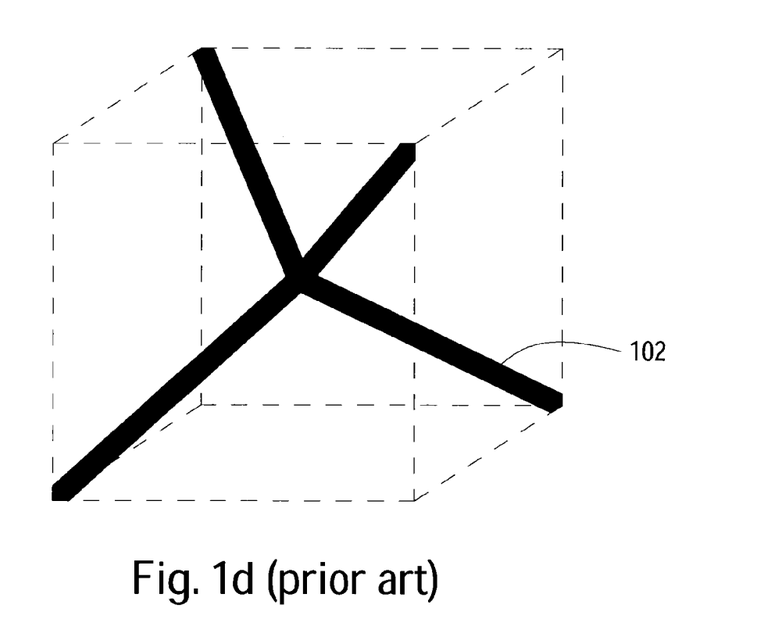

FIG. 1a and FIG. 1b are diagrams of lattice structure and disclination line, respectively, of the first blue phase liquid crystals. FIG. 1c and FIG. 1d are diagrams of lattice structure and disclination line, respectively, of the second blue phase liquid crystals. As shown in FIG. 1a and FIG. 1c, basic units of the lattice structures of the first and second blue phase liquid crystals are double twist cylinders (DTC) 100; that is, the double twist cylinders therein are arranged perpendicular with each other. Moreover, the first blue phase liquid crystals have body-centered cubic (BCC) structures, and the second blue phase liquid crystals have simple cubic (SC) structures. The disclination lines 102 of the first blue phase liquid crystals and the second blue phase liquid crystals are shown in FIG. 1b and FIG. 1d. Other than nematic liquid crystals, smectic liquid crystals and isotropic liquid crystals, the first blue phase liquid crystals and the second blue phase liquid crystals are shown as platelet texture patterns when they are viewed under a polarizing microscope.

Figure 2:
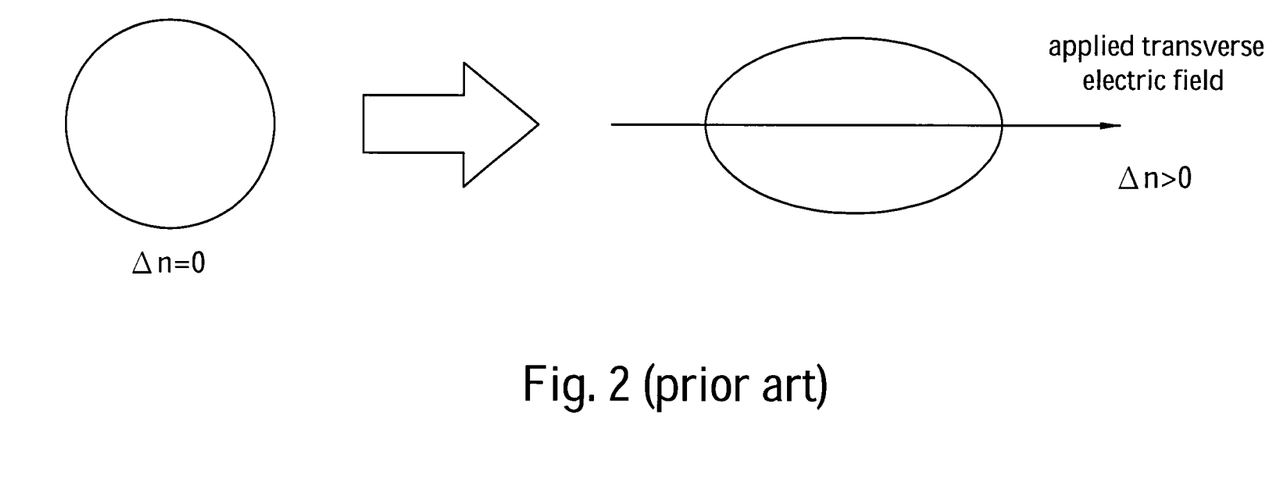
FIG. 2 is a diagram of the positive blue phase liquid crystals changing when driven by the electrodes.

On the other hand, the horizontal electric field produced by electrodes is conventionally used to change the refractive index of the positive blue phase liquid crystals, such that the bright/dark state of the liquid crystals changes after the light passes through the liquid crystals. FIG. 2 is a schematic diagram of the positive blue phase liquid crystals when being driven by electrodes. As shown in FIG. 2, without a horizontal electric field, the positive blue phase liquid crystals are isotropic in ideal and the refractive index change (i.e. $\Delta n$) thereof is 0 (zero). In addition, the positive blue phase liquid crystals in ideal are normally black, which herein means that the blue phase liquid crystals cannot be passed by light when the voltage is not applied thereto. Conversely, when the horizontal electric field is applied to the positive blue phase liquid crystals, the positive blue phase liquid crystals are anisotropic and the refractive index thereof changes (i.e. $\Delta n > 0$), such that the light can pass through the blue phase liquid crystals and the bright state can be performed.

However, for the liquid crystal displays using the positive blue phase liquid crystals, the double twist cylinder structures of the blue phase liquid crystals are not perfect in practice, so a bit of light still can pass through the blue phase liquid crystals when the blue phase liquid crystals are in the dark state. In other words, the blue phase liquid crystals, as shown in FIG. 2, thus have light leakage in the dark state.

Moreover, since the problem of light leakage in the dark state cannot be solved by the applied horizontal electric field, the contrast ratio for the positive blue phase liquid crystal display also decreases accordingly.

SUMMARY

In accordance with one embodiment of the present invention, a method of fabricating a blue phase liquid crystal display is provided. A first substrate is arranged opposite to a second substrate, in which the first substrate comprises a first electrode and the second substrate comprises a second electrode. A blue phase liquid crystal layer is arranged to be sealed between the first substrate and the second substrate, in which the blue phase liquid crystal layer comprises a positive blue phase liquid crystal and a monomer. A voltage is applied to the first electrode of the first substrate and the second electrode of the second substrate such that a vertical electric field is formed in the blue phase liquid crystal layer and substantially perpendicular to the first electrode and the second electrode. The blue phase liquid crystal layer is illuminated with a light source such that the monomer are polymerized to produce the polymer-stabilized positive blue phase liquid crystal.

In accordance with another embodiment of the present invention, a blue phase liquid crystal display is provided. The blue phase liquid crystal display comprises a first substrate, a second substrate and a blue phase liquid crystal layer. The first substrate comprises a first electrode. The second substrate is relatively disposed opposite to the first substrate and comprises a second electrode. The blue phase liquid crystal layer comprises a polymer-stabilized positive blue phase liquid crystal and is sealed between the first substrate and the second substrate, in which the polymer-stabilized positive blue phase liquid crystal is produced by a positive blue phase liquid crystal reacting with a monomer with a voltage applied to the first substrate and the second substrate, such that a vertical electric field is formed in the blue phase liquid crystal layer and perpendicular to the first electrode and the second electrode and by illuminating the blue phase liquid crystal layer with a light source such that the monomer performs polymerization.

According to the embodiments of the present invention, the blue phase liquid crystal display and the method of fabricating the same can be applied such that the blue phase liquid crystal display tends to become more isotropic in practice, in order to reduce light leakage in the dark state and enhance the contrast ratio of images at the same time.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows.

DESCRIPTION OF THE EMBODIMENTS

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

The terms used in this specification generally have their ordinary meanings in the art and in the specific context where each term is used. The use of examples anywhere in this specification, including examples of any terms discussed herein, is illustrative only, and in no way limits the scope and meaning of the invention or of any exemplified term. Likewise, the present invention is not limited to various embodiments given in this specification.

As used herein, the terms "comprising," "including," "having," "containing," "involving," and the like are to be understood to be open-ended, i.e., to mean including but not limited to.

As used herein, the term "a positive blue phase liquid crystal" or "positive blue phase liquid crystals" is understood to mean a plurality of positive blue phase liquid crystal molecules, and "a monomer" or "monomers" is understood to mean a plurality of monomer molecules.

Reference throughout the specification to "one embodiment" or "an embodiment" means that a particular feature, structure, implementation, or characteristic described in connection with the embodiment is included in at least one embodiment of the present invention. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 3:
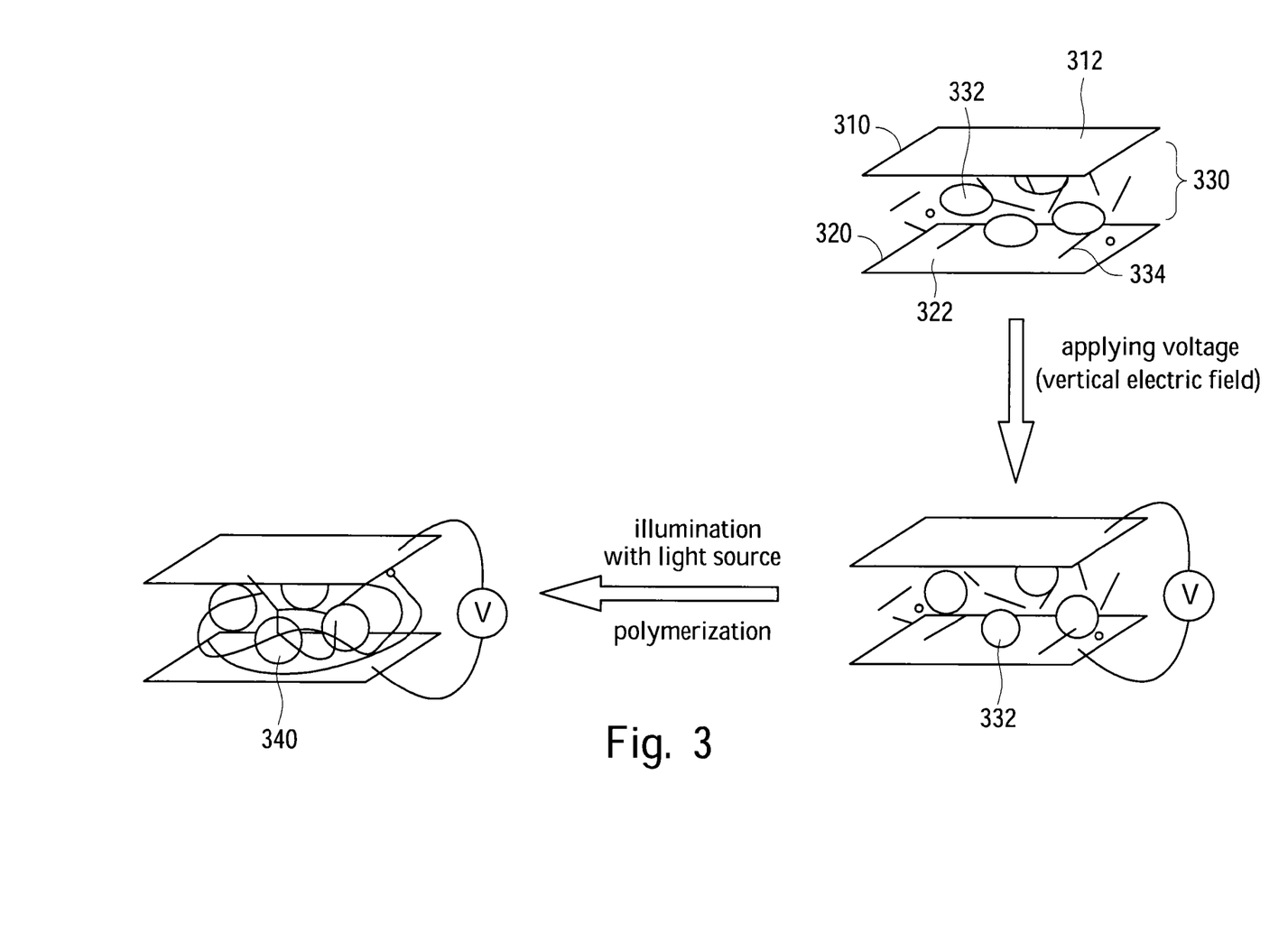
FIG. 3 is a flow chart of a method of fabricating a blue phase liquid crystal display in accordance with one embodiment of the present invention.

FIG. 3 is a flow chart of a method of fabricating a blue phase liquid crystal display in accordance with one embodiment of the present invention. In order to describe and give prominence to the following embodiments in convenience, the embodiment in FIG. 3 only shows essential parts of fabrication process of the blue phase liquid crystal display. The practical fabrication process of the blue phase liquid crystal display is not limited to that shown in FIG. 3. One person skilled in the art can refer to the embodiment with other known fabrication processes to accomplish the fabrication of the blue phase liquid crystal display.

As illustrated in FIG. 3, a first substrate 310 is arranged opposite to and parallel with a second substrate 320, in which the first substrate 310 includes a first electrode 312 and the second substrate 320 includes a second electrode 322. In the present embodiment, the first substrate 310 is, for example, a color filter substrate, and the second substrate 320 is, for example, a thin-film transistor array substrate.

Then, a blue phase liquid crystal layer 330 is arranged to be sealed between the first substrate 310 and the second substrate 320, and the blue phase liquid crystal layer 330 includes positive blue phase liquid crystals 332 and monomers 334. Substances of the positive blue phase liquid crystals 332 and the monomers 334 are well known for one person skilled in the art, so unnecessary details are not given herein. The positive blue phase liquid crystals 332 can be formed by placing the normal-state liquid crystals in a certain temperature range. The monomers 334 can be used for the following polymerization to produce polymer-stabilized positive blue phase liquid crystals 340, so that the polymer-stabilized positive blue phase liquid crystals 340 can be operated within a wider temperature range.

In the embodiment of the present invention, a voltage V (curing voltage) is applied to the first electrode 312 of the first substrate 310 and the second electrode 322 of the second substrate 320, so that a vertical electric field is formed in the blue phase liquid crystal layer 330 and substantially perpendicular to the first electrode 312 and the second electrode 322. In the present embodiment, the voltage V applied to the first electrode 312 and the second electrode 322 may be in a range between about 1 volt and about 100 volts. The vertical electric field formed by the voltage V is preferably applied to the positive blue phase liquid crystals 332 in a blue phase temperature range of the positive blue phase liquid crystals 332, in which the blue phase temperature range is a range from about −10° C. to about 60° C.

Thereafter, the blue phase liquid crystal layer 330 is illuminated with a light source such that the monomers 334 perform polymerization and are polymerized with the positive blue phase liquid crystals 332 to produce the polymer-stabilized positive blue phase liquid crystals 340. In the present embodiment, the light source includes an ultraviolet light, a visible light, an infrared light, and the combination thereof, in which the infrared light may be produced by a heat source or an infrared light source so as to perform a pre-curing process, and then the ultraviolet light can be used to perform an UV curing process to cure the blue phase liquid crystal layer 330.

At that moment, the vertical electric field is formed in the blue phase liquid crystal layer 330 according to the voltage V, so the positive blue phase liquid crystals 332 are affected by the vertical electric field to be in an ideal state; in other words, the polymerized polymer-stabilized positive blue phase liquid crystals 340 are optically isotropic and in a better dark state with less light leakages, due to the vertical electric field.

Notably, the step of applying the voltage V to form the vertical electric field and the step of illuminating the blue phase liquid crystal layer 330 with the light source in the embodiments of the present invention, can be performed in sequence or at the same time. A person skilled in the art can modify the step sequence based on the practical fabrication process rather than limiting of the foregoing process.

Specific embodiments are shown as follows in order to describe the structure of the blue phase liquid crystal display fabricated by the foregoing method and the method of driving the same. The following embodiments are, however, only illustrated for convenience rather than limiting of the practical structure and driving method of the blue phase liquid crystal display.

Figure 4A:
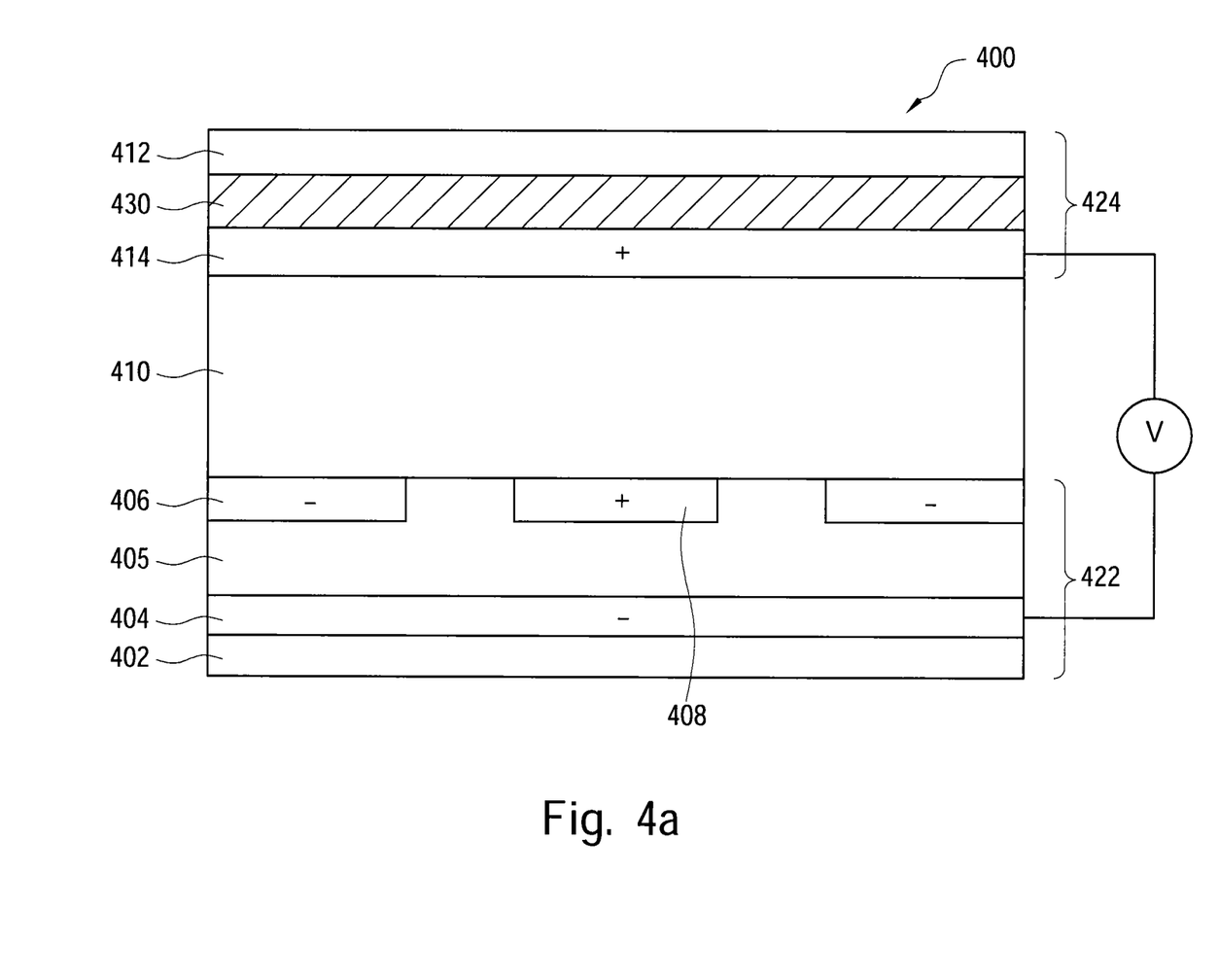
FIG. 4a is a diagram of a blue phase liquid crystal display in accordance with a first embodiment of the present invention.

FIG. 4a is a diagram of a blue phase liquid crystal display in accordance with a first embodiment of t. display 400 includes a first substrate (e.g. color filter substrate 424), a second substrate (e.g. thin-film transistor array substrate 422) and a blue phase liquid crystal layer 410. The blue phase liquid crystal layer 410 is disposed between the color filter substrate 424 and the thin-film transistor array substrate 422, and includes polymer-stabilized positive blue phase liquid crystals produced by the foregoing method.

For example, the thin-film transistor array substrate 422 may include a first transparent substrate 402, a first vertical electrode 404, a dielectric layer 405, a first pixel electrode 406 and a first opposite electrode 408. The color filter substrate 424 may include a second transparent substrate 412, a color filter layer 430 and a second vertical electrode 414. In addition, a thin-film transistor and related circuit structures, such as scan lines, a gate insulation layer, a channel layer, data lines, a drain electrode, a passivation layer, etc., may further be arranged in the first transparent substrate 402. A black matrix (not shown) may further be arranged in the second transparent substrate 412 to define areas corresponding to pixels and to cover the portions outside the displaying regions, in order to avoid the side leakage of light. A thin-film transistor array substrate in detail is well known for a person skilled in the art, so unnecessary details are not given herein.

As illustrated in FIG. 4a, the first transparent substrate 402 and the second transparent substrate 412 are disposed opposite to each other. The first pixel electrode 406 and the first opposite electrode 408 are disposed laterally. The first vertical electrode 404 and the second vertical electrode 414 are disposed opposite to each other, so that the first vertical electrode 404 faces the color filter substrate 424. The second vertical electrode 414 faces the thin-film transistor array substrate 422. The blue phase liquid crystal layer 410 is disposed between the first vertical electrode 404 and the second vertical electrode 414. Moreover, the first pixel electrode 406 and the first opposite electrode 408 may respectively include finger electrodes which interlace and are adjacent to each other.

In fabrication, the curing voltage V may be applied to the first vertical electrode 404 and the second vertical electrode 414 during the polymerization process shown in FIG. 3, such that the first vertical electrode 404 and the second vertical electrode 414 separately have different electric potential (e.g. negative electric potential and positive electric potential), and the vertical electric field perpendicular to the first transparent substrate 402 and the second transparent substrate 412 may be formed between the first vertical electrode 404 and the second vertical electrode 414, so as to auxiliarily compensate for the isotropy of the polymer-stabilized positive blue phase liquid crystals in the blue phase liquid crystal layer 410, resulting in that the polymer-stabilized positive blue phase liquid crystals have better isotropy due to the vertical electric field, to effectively reduce the phenomenon of light leakage in the dark state caused by construction features of the liquid crystals.

On the other hand, after the blue phase liquid crystal display 400 is fabricated, an operating voltage may be applied to the blue phase liquid crystal display 400 so that the blue phase liquid crystal display 400 has the horizontal electric field therein, such as the horizontal electric field under an in-plane switching (IPS) mode, so as to control the light transmittance and the brightness of images shown on the blue phase liquid crystal display 400. Specifically, the operating voltage may be applied to the first pixel electrode 406 and the first opposite electrode 408, so that the first pixel electrode 406 and the first opposite electrode 408 separately have different electric potential (e.g. negative electric potential and positive electric potential), and the horizontal electric field may be formed between the first pixel electrode 406 and the first opposite electrode 408, so that the horizontal electric field is parallel with the first transparent substrate 402 and the second transparent substrate 412, so as to drive and control the polymer-stabilized positive blue phase liquid crystals to perform the bright state.

Figure 4B:
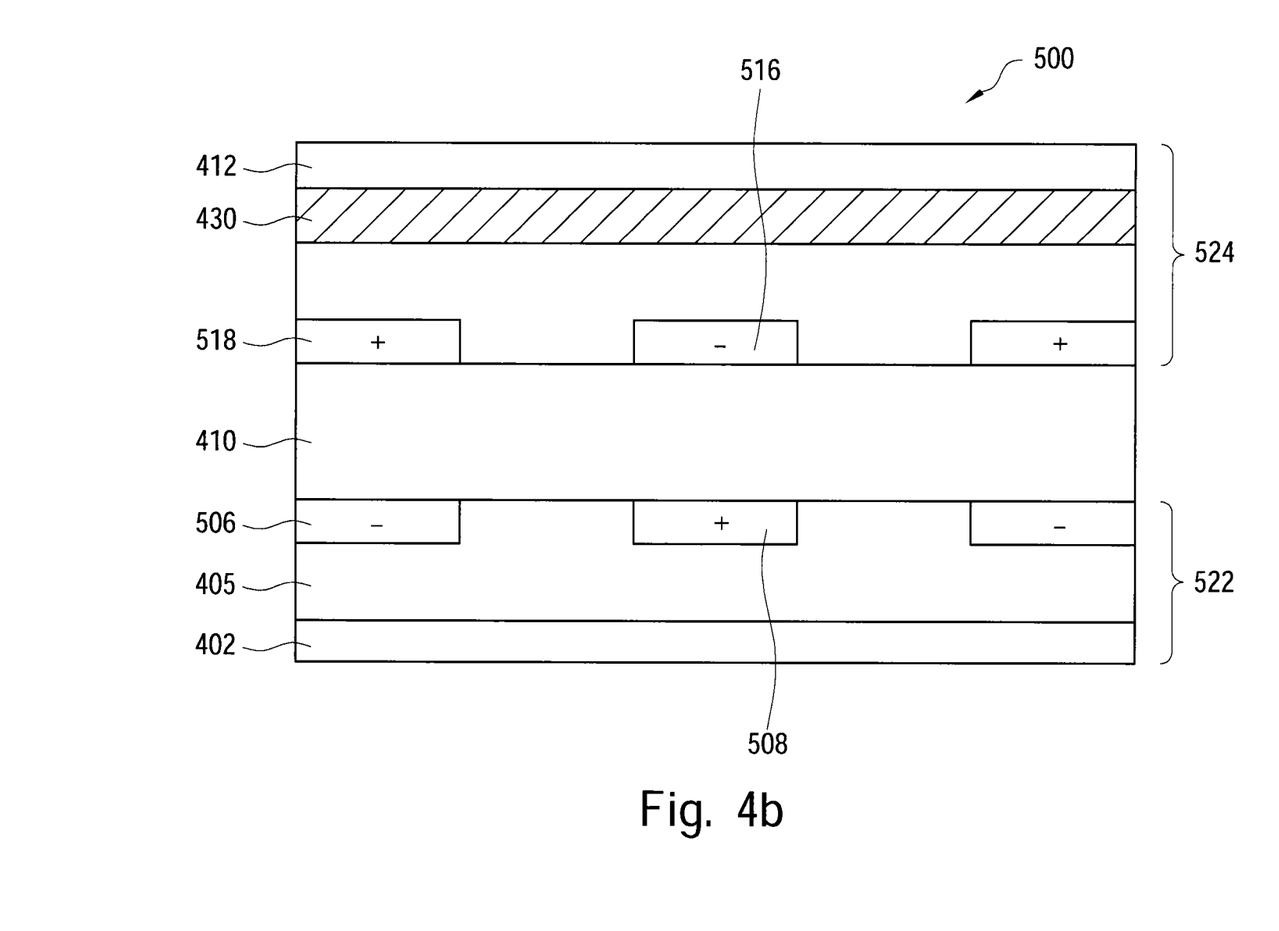
FIG. 4b is a diagram of a blue phase liquid crystal display in accordance with a second embodiment of the present invention.

FIG. 4b is a diagram of a blue phase liquid crystal display in accordance with a second embodiment of the present invention. The blue phase liquid crystal display 500 includes a first substrate (e.g. color filter thin-film transistor array substrate 524), a second substrate (e.g. thin-film transistor array substrate 522) and the blue phase liquid crystal layer 410. Compared to FIG. 4a, the blue phase liquid crystal display 500 does not include the first vertical electrode 404 and the second vertical electrode 414 mentioned above, but the color filter thin-film transistor array substrate 524 includes a second pixel electrode 516 and a second opposite electrode 518 instead. The second pixel electrode 516 and the second opposite electrode 518 are disposed laterally and located on the inner side of the second transparent substrate 412 to face the first transparent substrate 402.

As illustrated in FIG. 4b, the second pixel electrode 516 is disposed opposite to the first opposite electrode 508, and the second opposite electrode 518 is disposed opposite to the first pixel electrode 506, such that the first pixel electrode 506 and the first opposite electrode 508 both face the color filter thin-film transistor array substrate 524, and the second pixel electrode 516 and the second opposite electrode 518 both face the thin-film transistor array substrate 522. In addition, the second pixel electrode 516 and the second opposite electrode 518 may respectively include finger electrodes which interlace and are adjacent to each other.

In fabrication, voltages may be applied to the electrodes of the color filter thin-film transistor array substrate 524 and the thin-film transistor array substrate 522, such that the first pixel electrode 506 and the second opposite electrode 518 separately have different electric potential (e.g. negative electric potential and positive electric potential), and the first opposite electrode 508 and the second pixel electrode 516 separately have different electric potential (e.g. positive electric potential and negative electric potential). Accordingly, the vertical electric field perpendicular to the first transparent substrate 402 and the second transparent substrate 412 is formed between the first pixel electrode 506 and the second opposite electrode 518 and formed between the first opposite electrode 508 and the second pixel electrode 516, so as to auxiliarily compensate for the isotropy of the polymer-stabilized positive blue phase liquid crystals in the blue phase liquid crystal layer 410, resulting in that the polymer-stabilized positive blue phase liquid crystals have better isotropy due to the vertical electric field, to effectively reduce the phenomenon of light leakage in the dark state caused by construction features of the liquid crystals.

On the other hand, an operating voltage may be applied to the blue phase liquid crystal display 500 so that the blue phase liquid crystal display 500 has the horizontal electric field therein, such as the horizontal electric field under the in-plane switching (IPS) mode, so as to control the light transmittance and the brightness of images shown on the blue phase liquid crystal display 500. Specifically, the operating voltage may be applied to the first pixel electrode 506 and the first opposite electrode 508, or applied to the second pixel electrode 516 and the second opposite electrode 518, so that they separately have different electric potential, and the horizontal electric field is formed between the first pixel electrode 506 and the first opposite electrode 508, or is formed between the second pixel electrode 516 and the second opposite electrode 518, so as to drive and control the polymer-stabilized positive blue phase liquid crystals to perform the bright state.

Figure 4C:
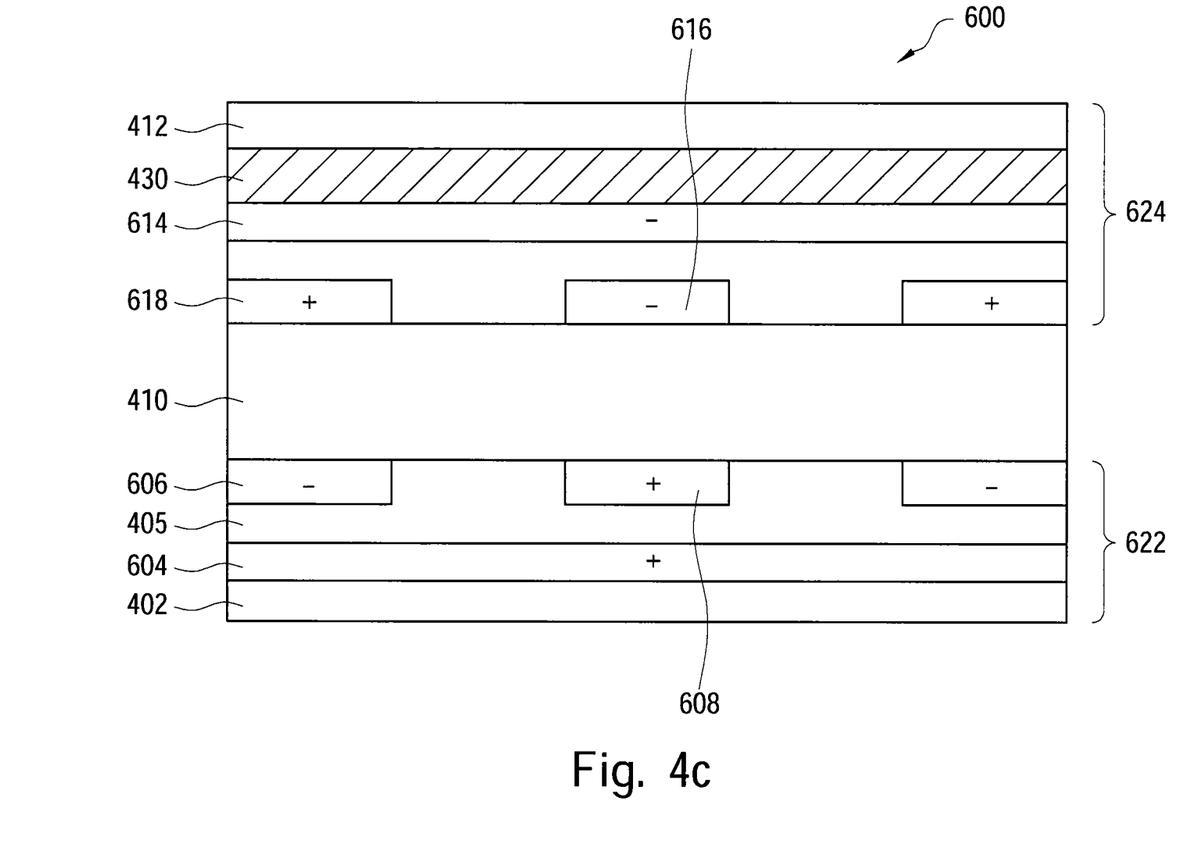
FIG. 4c is a diagram of a blue phase liquid crystal display in accordance with a third embodiment of the present invention.

FIG. 4c is a diagram of a blue phase liquid crystal display in accordance with a third embodiment of the present invention. The blue phase liquid crystal display 600 includes a first substrate (e.g. color filter thin-film transistor array substrate 624), a second substrate (e.g. thin-film transistor array substrate 622) and the blue phase liquid crystal layer 410. Compared to FIG. 4a, the blue phase liquid crystal display 600 in the present embodiment further includes a second pixel electrode 616 and a second opposite electrode 618. The second pixel electrode 616 and the second opposite electrode 618 are disposed laterally, located on the inner side of the second transparent substrate 412 to face the first transparent substrate 402, and located between the second vertical electrode 614 and the first vertical electrode 604.

As illustrated in FIG. 4c, the first vertical electrode 604 is disposed opposite to the second vertical electrode 614, the second pixel electrode 616 is disposed opposite to the first opposite electrode 608, and the second opposite electrode 618 is disposed opposite to the first pixel electrode 606, such that the first vertical electrode 604, the first pixel electrode 606 and the first opposite electrode 608 all face the color filter thin-film transistor array substrate 624, and the second vertical electrode 614, the second pixel electrode 616 and the second opposite electrode 618 all face the thin-film transistor array substrate 622. In addition, the second pixel electrode 616 and the second opposite electrode 618 may respectively include finger electrodes which interlace and are adjacent to each other.

In fabrication, voltages may be applied to the electrodes of the color filter thin-film transistor array substrate 624 and the thin-film transistor array substrate 622, such that the vertical electric field perpendicular to the first transparent substrate 402 and the second transparent substrate 412 may be formed between the first vertical electrode 604 and the second vertical electrode 614, between the first pixel electrode 606 and the second opposite electrode 618 and between the first opposite electrode 608 and the second pixel electrode 616, so as to auxiliarily compensate for the isotropy of the polymer-stabilized positive blue phase liquid crystals in the blue phase liquid crystal layer 410, resulting in that the polymer-stabilized positive blue phase liquid crystals have better isotropy due to the vertical electric field, to effectively reduce the phenomenon of light leakage in the dark state caused by construction features of the liquid crystals.

On the other hand, an operating voltage may be applied to the blue phase liquid crystal display 600 so that the blue phase liquid crystal display 600 has the horizontal electric field therein, such as the horizontal electric field under a fringe field switch (FFS) mode, so as to control the light transmittance and the brightness of images shown on the blue phase liquid crystal display 600. Specifically, the operating voltage may be applied to form the horizontal electric field between the first pixel electrode 606 and the first opposite electrode 608, or between the second pixel electrode 616 and the second opposite electrode 618, so as to drive and control the polymer-stabilized positive blue phase liquid crystals to perform the bright state.

Figure 4D:
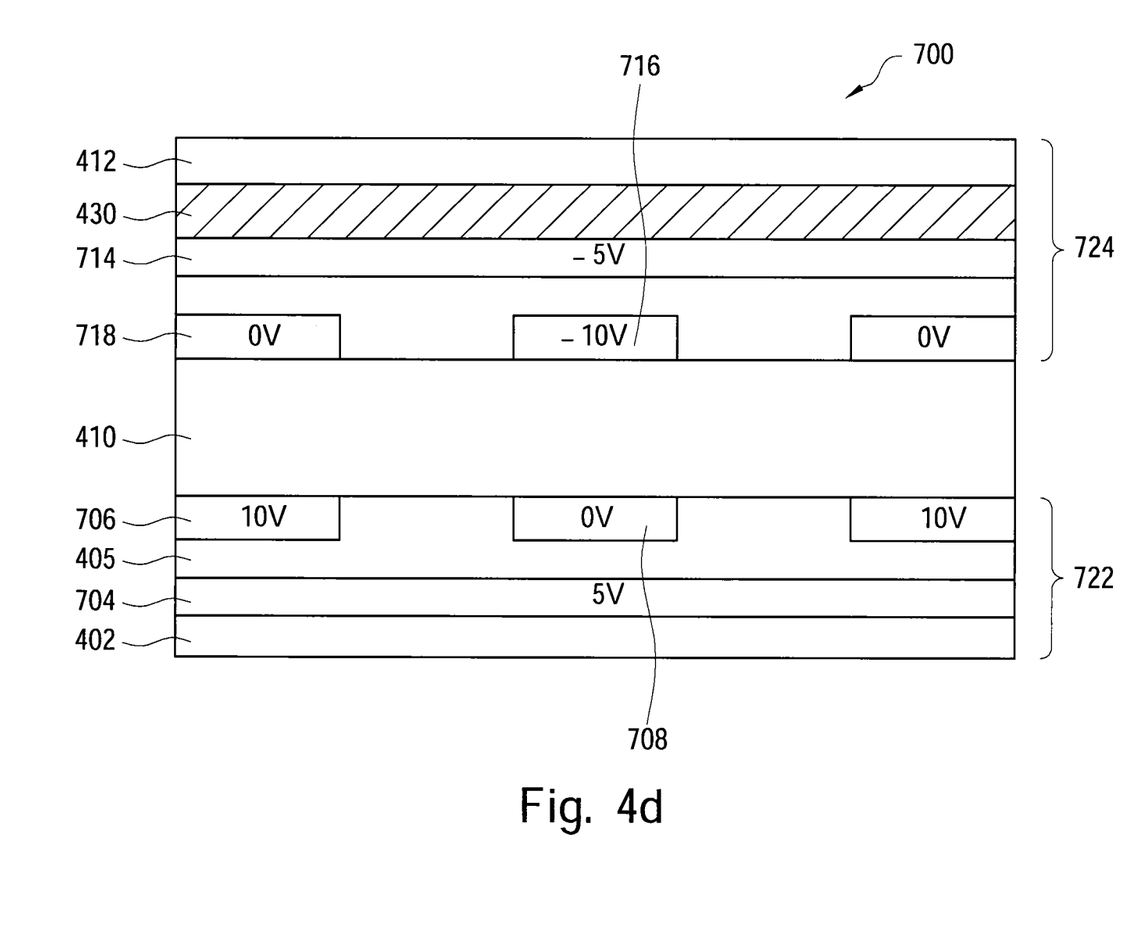
FIG. 4d is a diagram of a blue phase liquid crystal display in accordance with a fourth embodiment of the present invention.

FIG. 4d is a diagram of a blue phase liquid crystal display in accordance with a fourth embodiment of the present invention. For the second substrate (e.g. thin-film transistor array substrate 722) and the first substrate (e.g. color filter thin-film transistor array substrate 724) of the present embodiment, voltages applied to the first vertical electrode 704, the second vertical electrode 714, the first pixel electrode 706, the first opposite electrode 708, the second pixel electrode 716 and the second opposite electrode 718 are different from the applied voltages in FIG. 4c. Specifically, the electric potential of the first opposite electrode 708 and the second opposite electrode 718 may be set to 0 volt, the electric potential of the first vertical electrode 704 and the first pixel electrode 706 may be set to have a positive value, and the electric potential of the first vertical electrode 704 is smaller than that of the first pixel electrode 706; for example, the electric potential of the first vertical electrode 704 and the first pixel electrode 706 are 5 volts and 10 volts, respectively. In addition, the electric potential of the second vertical electrode 714 and the second pixel electrode 716 may be set to have a negative value, and the electric potential of the second vertical electrode 714 is larger than that of the second pixel electrode 716; for example, the electric potential of the second vertical electrode 714 and the second pixel electrode 716 are −5 volts and −10 volts, respectively.

As a result, vertical electric fields may be formed respectively between the first vertical electrode 704 and the second vertical electrode 714, between the second pixel electrode 716 and the first opposite electrode 708, and also between the second opposite electrode 718 and the first pixel electrode 706. Moreover, horizontal electric fields may be formed respectively between the first vertical electrode 704 and the first opposite electrode 708, between the second vertical electrode 714 and the second opposite electrode 718, between the first pixel electrode 706 and the first opposite electrode 708, and also between the second pixel electrode 716 and the second opposite electrode 718.

Substances of the electrodes in the foregoing embodiments may in practice include transparent conductive material such as indium tin oxide (ITO), indium zinc oxide (IZO), etc., or conductive polymers such as Poly(3,4-ethylenedioxythiophene) (also named PEDOT), but are not limited thereto. In other words, the electrodes in the embodiments of the present invention may include any material with good conductivity in practice.

As shown in the embodiments of FIGS. 4a to 4d, with double-sided electrodes, the horizontal electric field and the vertical electric field can thus be formed in the blue phase liquid crystal layer 410, so as to effectively control the transmittance of the polymer-stabilized positive blue phase liquid crystals and reduce the phenomenon of light leakage in the dark state.

Figure 5:
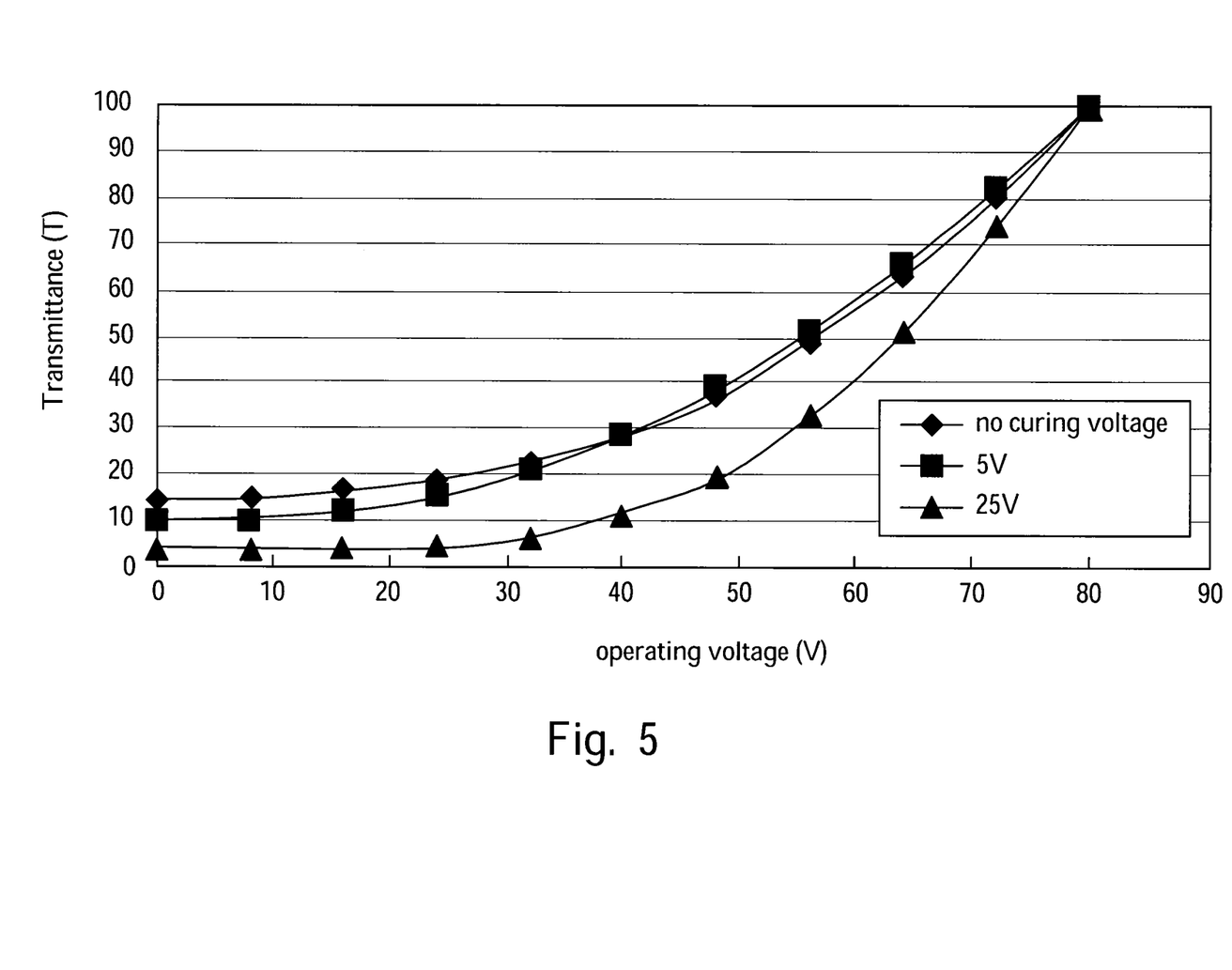
FIG. 5 is a variation diagram of the transmittance in relation to the applied operating voltage for the polymer-stabilized positive blue phase liquid crystals with different vertical electric fields, in the blue phase liquid crystal display fabricated with different vertical electric fields, by the method illustrated in FIG. 3.

FIG. 5 is a variation diagram of the transmittance in relation to the applied operating voltage for the polymer-stabilized positive blue phase liquid crystals with different vertical electric fields, in the blue phase liquid crystal display fabricated with different vertical electric fields, by the method illustrated in FIG. 3. As illustrated in FIG. 5, under the conditions of no curing voltage, 5-volt curing voltage and 25-volt curing voltage being applied during the polymerization process, taking the operating voltage of 0 volt for example, the phenomenon of light leakage in the dark state for the polymer-stabilized positive blue phase liquid crystals is more apparent when no curing voltage is applied (e.g. transmittance T is higher than that under the conditions of 5-volt and 25-volt curing voltage being applied). Conversely, the phenomenon of light leakage in the dark state for the polymer-stabilized positive blue phase liquid crystals, under the conditions of 5-volt and 25-volt curing voltage being applied, is gradually improved (e.g. increase of curing voltage is followed by decrease of transmittance T). In addition, as illustrated in FIG. 5, even if the operating voltage is applied to the polymer-stabilized positive blue phase liquid crystals, the transmittance under the condition of 25-volt curing voltage being applied is still lower than that under the conditions of no curing voltage and 5-volt curing voltage being applied; that is, the phenomenon of light leakage in the dark state can be better lowered.

Therefore, the phenomenon of light leakage in the dark state for the polymer-stabilized positive blue phase liquid crystals, under the conditions without operating voltage and with operating voltage, will be diminished when the intensity of the vertical electric field produced by the curing voltage increases. In other words, under the conditions without operating voltage and with operating voltage, the non-ideal transmittance of the blue phase liquid crystals will decrease when the intensity of the vertical electric field increases. For example, the transmittance of the blue phase liquid crystals decreases from 0.6% to 0.05% when the intensity of the vertical electric field increases, and experimental data can be shown in FIG. 5 after being normalized. Since a contrast ratio (CR) of the display represents the ratio of brightness in the brightest state to brightness in the darkest state of the display, the contrast ratio of the blue phase liquid crystal display fabricated without curing voltage (e.g. 0-volt voltage) during the polymerization process is 6.81, and the contrast ratio of the blue phase liquid crystal display fabricated with 25-volt curing voltage during the same process can be increased to 25.46, as known by the normalized data shown in FIG. 5.

Figure 6:
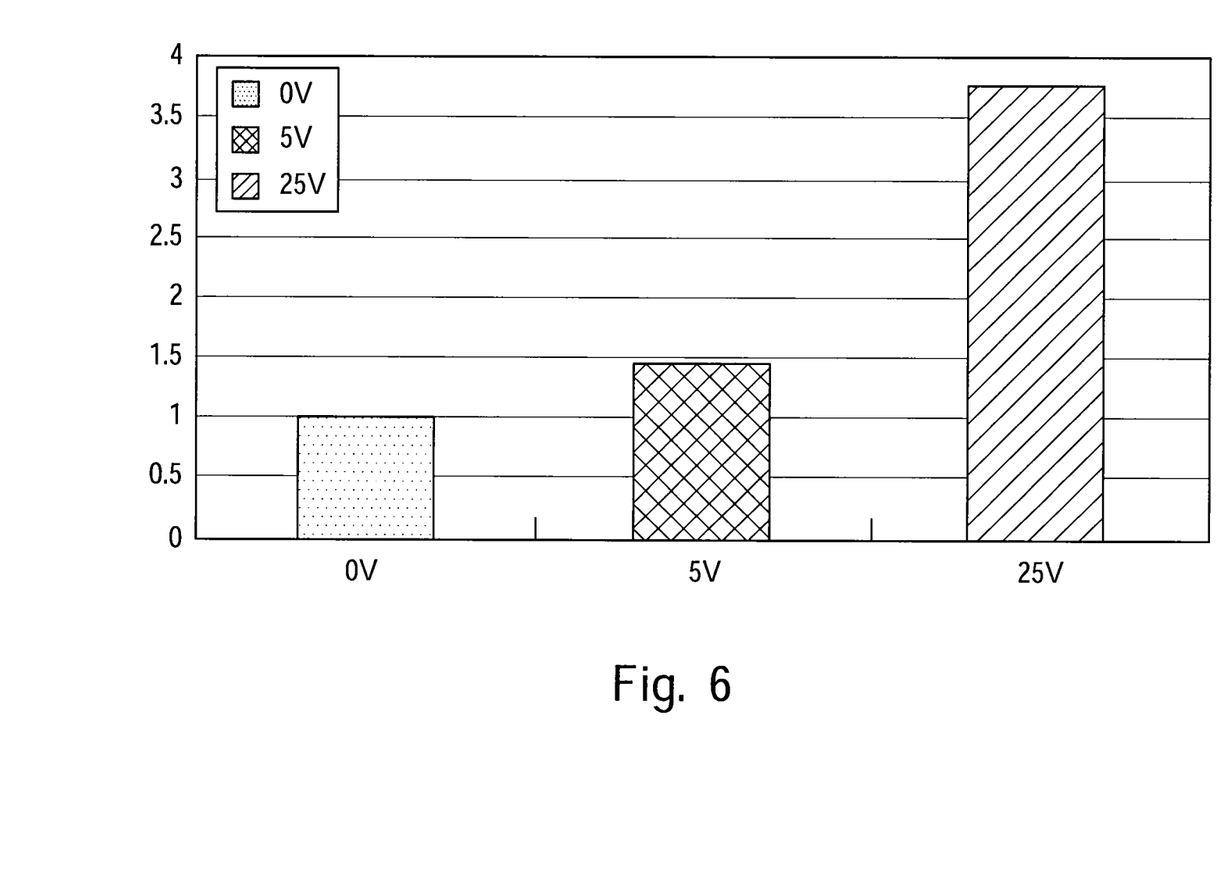
FIG. 6 is a comparison diagram of the relative contrast ratios corresponding to different vertical electric fields for the polymer-stabilized positive blue phase liquid crystals in the blue phase liquid crystal display fabricated by the method illustrated in FIG. 3.

FIG. 6 is a comparison diagram of the relative contrast ratios corresponding to different vertical electric fields for the polymer-stabilized positive blue phase liquid crystals in the blue phase liquid crystal display fabricated by the method illustrated in FIG. 3. As illustrated in FIG. 6, if the relative contrast ratio of the blue phase liquid crystal display fabricated without bias (e.g. 0-volt voltage) during the polymerization process is set to 1, then the relative contrast ratio of the blue phase liquid crystal display fabricated with 25-volt voltage to form the vertical electric field during the same process can be increased to 3.7.

On the other hand, in order to broaden the range of operating temperature of liquid crystals, reactive monomers are added into the liquid crystal layer so as to form the polymer-stabilized positive blue phase liquid crystals during the polymerization process, but this usually results in that the positive blue phase liquid crystals cannot perform with an ideal isotropy when no voltage is applied, and further results in that the positive blue phase liquid crystals have light leakage in the dark state and the contrast ratio of the displayed image is reduced.

However, as shown in the foregoing embodiments of the present invention, the electrodes on two sides of the blue phase liquid crystal layer are applied with voltages during the polymerization process so that the blue phase liquid crystals are influenced by the vertical electric field during the polymerization process, and such a manner can compensate for the polymer-stabilized positive blue phase liquid crystals so that the polymer-stabilized positive blue phase liquid crystals in practice are more isotropic, to effectively reduce the phenomenon of light leakage in the dark state and increase the contrast ratio of the images at the same time.

The steps are not recited in the sequence in which the steps are performed. That is, unless the sequence of the steps is expressly indicated, the sequence of the steps is interchangeable, and all or part of the steps may be simultaneously, partially simultaneously, or sequentially performed.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. A method of fabricating and driving a blue phase liquid crystal display, comprising:
    arranging a first substrate opposite to a second substrate, wherein the first substrate comprises a first vertical electrode, an opposite electrode and a pixel electrode, and the second substrate comprises a second vertical electrode, and a vertical electric field is formed between the first vertical electrode and the second vertical electrode;
    arranging a blue phase liquid crystal layer sealed between the first substrate and the second substrate, wherein the blue phase liquid crystal layer comprises a positive blue phase liquid crystal and a monomer;
    applying a curing voltage to the first vertical electrode of the first substrate and the second vertical electrode of the second substrate such that the vertical electric field is formed in the blue phase liquid crystal layer and substantially perpendicular to the first vertical electrode and the second vertical electrode;
    illuminating the blue phase liquid crystal layer formed with the vertical electric field therein with a light source such that the monomer performs polymerization to produce a polymer-stabilized positive blue phase liquid crystal; and
    driving the polymer-stabilized positive blue phase liquid crystal by the opposite electrode and the pixel electrode of the first substrate.

2. The method as claimed in claim 1, wherein the first substrate comprises a color filter substrate, and the second substrate comprises a thin-film transistor array substrate.

3. The method as claimed in claim 1, wherein the curing voltage applied to the first vertical electrode and the second vertical electrode ranges between about 2 volts and about 100 volts.

4. The method as claimed in claim 1, wherein the positive blue phase liquid crystal in the blue phase liquid crystal layer has a blue phase temperature range, and the vertical electric field is applied to the positive blue phase liquid crystal in the blue phase temperature range.

5. The method as claimed in claim 4, wherein the blue phase temperature range is from about $-10°$ C. to about $60°$ C.

6. The method as claimed in claim 1, wherein the light source comprises an ultraviolet light, a visible light, an infrared light, and the combination thereof.

7. A blue phase liquid crystal display, comprising:
    a first substrate including a first vertical electrode, an opposite electrode and a pixel electrode;

a second substrate including a second vertical electrode, the second substrate being relatively disposed opposite to the first substrate; and a blue phase liquid crystal layer including a polymer-stabilized positive blue phase liquid crystal and sealed between the first substrate and the second substrate, the polymer-stabilized positive blue phase liquid crystal being produced by a positive blue phase liquid crystal reacting with a monomer, a curing voltage being applied to the first substrate and the second substrate, such that a vertical electric field being formed in the blue phase liquid crystal layer and substantially perpendicular to the first vertical electrode and the second vertical electrode, a light source illuminating the blue phase liquid crystal layer formed with the vertical electric field therein such that the monomer being polymerized to form the polymer-stabilized positive blue phase liquid crystal, and the polymer-stabilized positive blue phase liquid crystal is driven by the opposite electrode and the pixel electrode.

8. The blue phase liquid crystal display as claimed in claim 7, wherein the first substrate comprises the first vertical electrode facing the second substrate, the second substrate comprises the second vertical electrode facing the first substrate, and the vertical electric field is formed between the first vertical electrode and the second vertical electrode.

9. The blue phase liquid crystal display as claimed in claim 7, wherein the first substrate comprises a color filter substrate, and the second substrate comprises a thin-film transistor array substrate.

10. The blue phase liquid crystal display as claimed in claim 7, wherein the curing voltage applied to the first vertical electrode and the second vertical electrode ranges between about 2 volts and about 100 volts.

11. The blue phase liquid crystal display as claimed in claim 7, wherein the positive blue phase liquid crystal in the blue phase liquid crystal layer has a blue phase temperature range, and the vertical electric field is applied to the positive blue phase liquid crystal in the blue phase temperature range.

12. The blue phase liquid crystal display as claimed in claim 11, wherein the blue phase temperature range is from about −10° C. to about 60° C.

13. The blue phase liquid crystal display as claimed in claim 7, wherein the light source comprises an ultraviolet light, a visible light, an infrared light, and the combination thereof.

14. A blue phase liquid crystal display, comprising:

a first substrate including a first pixel electrode and a first opposite electrode, wherein the first pixel electrode and the first opposite electrode has a first qap therebetween;

a second substrate including a second opposite electrode and a second pixel electrode, the second substrate being relatively disposed opposite to the first substrate, wherein the second opposite electrode and the second pixel electrode has a second gap therebetween; and a blue phase liquid crystal layer including a polymer-stabilized positive blue phase liquid crystal and sealed between the first substrate and the second substrate, the polymer-stabilized positive blue phase liquid crystal being produced by a positive blue phase liquid crystal reacting with a monomer, a curing voltage being applied to the first substrate and the second substrate, such that a vertical electric field being formed in the blue phase liquid crystal layer and substantially perpendicular to the first pixel electrode, the second opposite electrode, the first opposite electrode and the second pixel electrode, a light source illuminating the blue phase liquid crystal layer formed with the vertical electric field therein such that the monomer being polymerized to form the polymer-stabilized positive blue phase liquid crystal, and the polymer-stabilized positive blue phase liquid crystal is driven by the first pixel electrode and first opposite electrode.

15. The blue phase liquid crystal display as claimed in claim 14, wherein the vertical electric field is formed between the first pixel electrode and the second opposite electrode, and between the first opposite electrode and the second pixel electrode.

16. The blue phase liquid crystal display as claimed in claim 14, wherein the positive blue phase liquid crystal in the blue phase liquid crystal layer has a blue phase temperature range, and the vertical electric field is applied to the positive blue phase liquid crystal in the blue phase temperature range.

* * * * *